Oct. 4, 1955 J. L. SCHNEIDER 2,719,564
METHOD AND APPARATUS FOR MAKING CLOSURE SEALS
Filed June 27, 1950 2 Sheets-Sheet 1
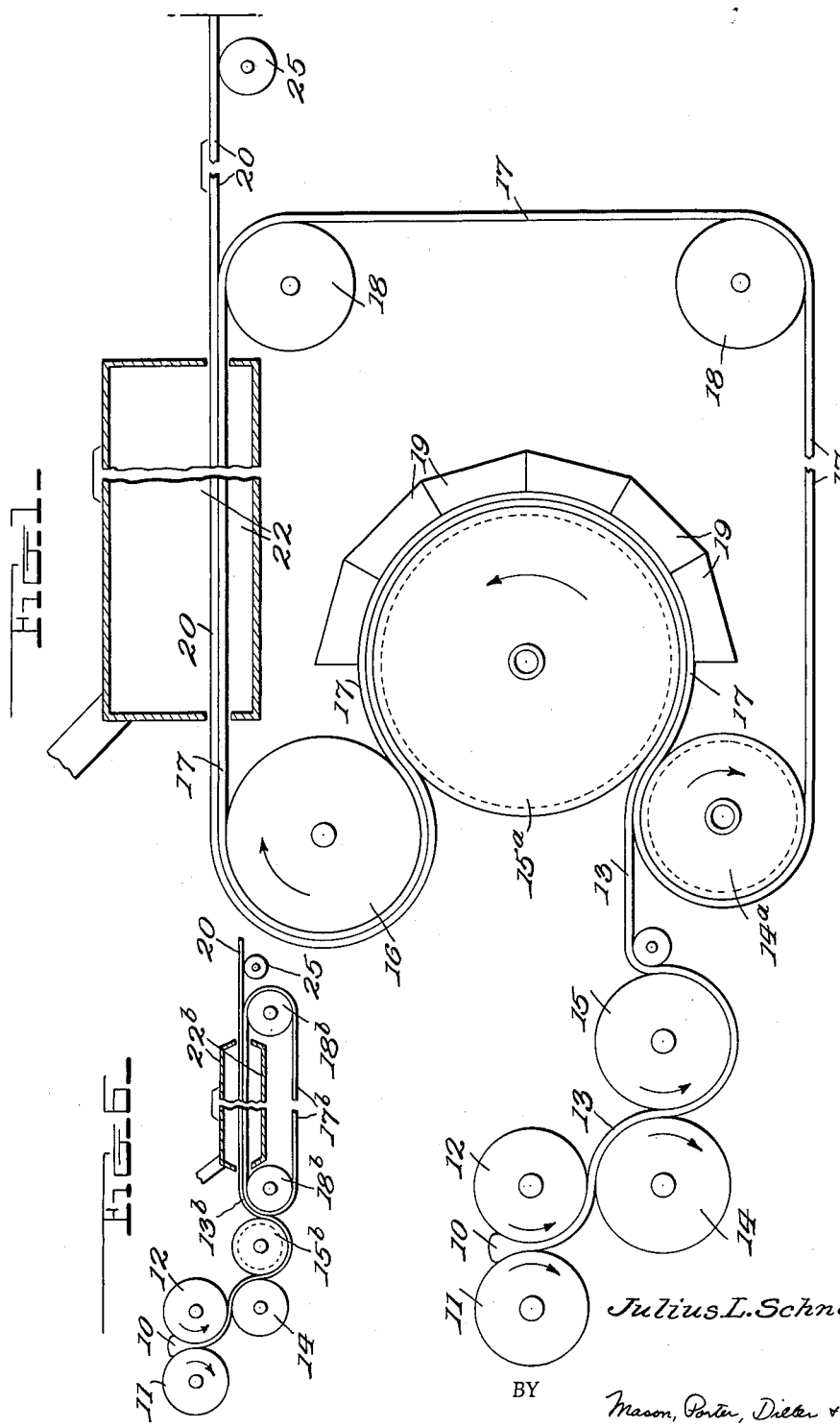
INVENTOR
*Julius L. Schneider,*
BY
*Mason, Porter, Diller & Stewart,*
ATTORNEYS

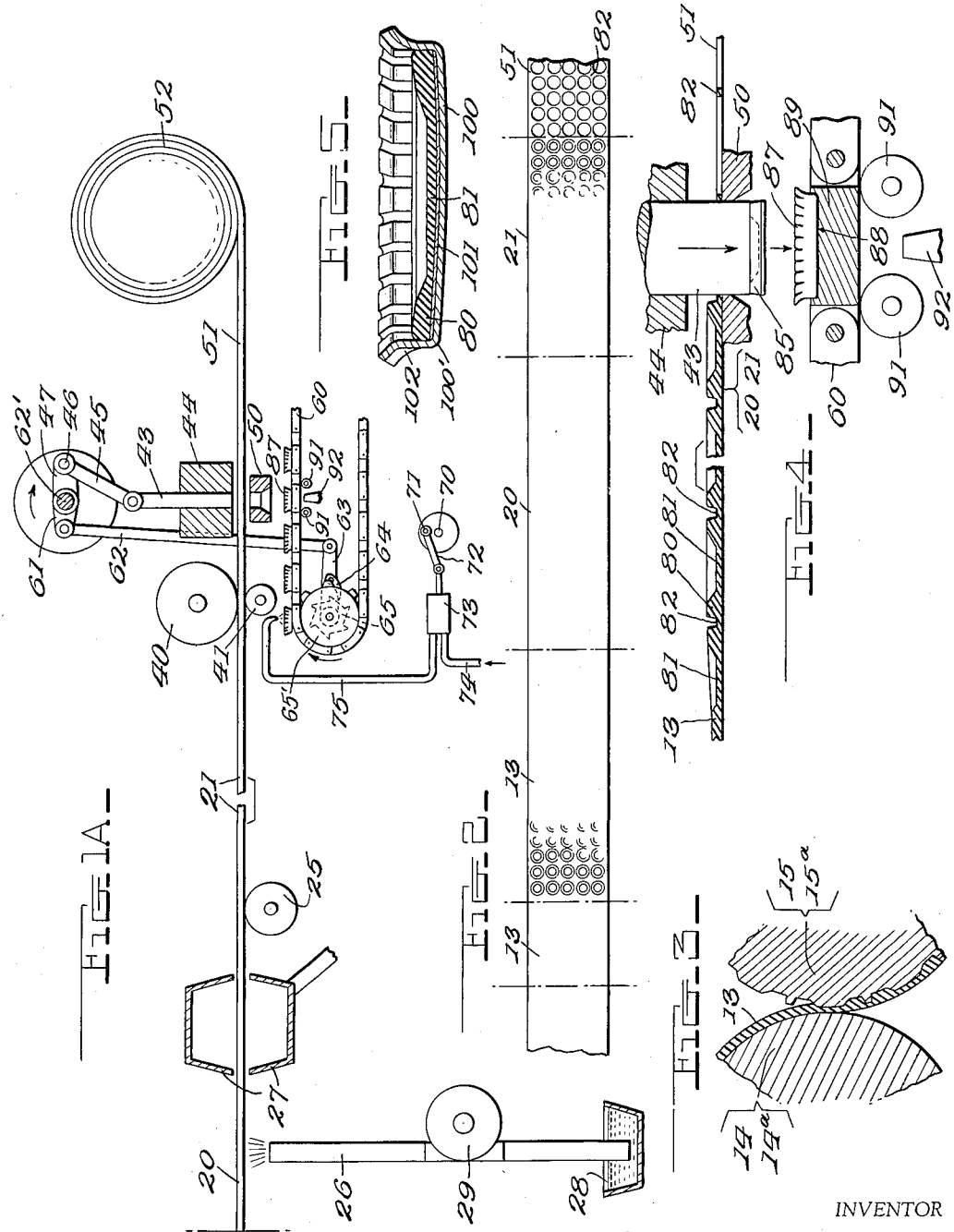

United States Patent Office 2,719,564
Patented Oct. 4, 1955

2,719,564

METHOD AND APPARATUS FOR MAKING CLOSURE SEALS

Julius L. Schneider, Chicago, Ill., assignor to Continental Can Company, Inc., New York, N. Y., a corporation of New York Application June 27, 1950, Serial No. 170,530

15 Claims. (Cl. 154—1.5)

This invention relates to the art of making closure seals, such as crown caps, having a shell and an elastic sealing cushion pad.

It has heretofore been a practice to make separate sealing pads of cork, rubber, and other composition materials in the form of disks of uniform thickness, and then to employ a cement for causing the same to adhere in the shells. It has also been a practice to cut the cushion pads from sheets of material. Likewise, it has been proposed to mold a rubber or other elastomer composition to provide a cushion pad having a thin central web and a thicker annulus for engaging the lip of the container to be closed. It has been proposed to roll out a sheet of rubber stock, and punch disks therefrom which are brought into contact with a heated crown shell and held by pressure for producing adhesion.

These practices have largely occurred where all the operations of making such closure seals, e. g. crown caps, are being accomplished in a single plant, and by use of individual machines for making the cushion pads, and for placing and causing them to adhere in the crown shells. The practices did not lend themselves to production at one place of the cushion pads in a form for easy handling and shipment, with final assembly at a bottling works which obtained its crown shells from a different point, particularly as the elastomer sheet stock was not entirely consumed in the punching operations, so that scrap was formed, to be discarded or to be returned for reworking, sometimes to the extent of 40 per cent or more of the sheet stock: although an advantage of employing elastomer compositions is the lack of need for the spots later applied to cork pads to prevent liquid penetration into the cork composition.

According to the present invention, elastomer composition pads are provided by a continuous operation at an elastomer factory, under control of skilled attendants, with the advantages of quantity production, and with the advantage of employing some of the product immediately in continuous operation for completing closure seals for sale; while other parts of the product can be stored for later use thereat, and yet other parts may be shipped to assembly plants localized near bottling, etc., works.

Further, the operation can be conducted so that there is maintained control of the product from the preparation of the elastomer composition until the assembly is completed, and a minor scrap of about 5 per cent is withdrawn as a coherent structure: and this control feature is present whether the shaped sheet is being immediately employed, or whether it is stored for a time, or shipped and used at a different assembly plant.

A feature of the present invention is that of forming a curable elastic composition of rubber or like elastomer base into a sheet, shaping the sheet to provide a plurality of spaced cushion pads at a front face thereof, each pad having an annular thick ring with a thin central web, the pads being joined in the sheet to form a unit structure by extremely thin connecting webs of scrap stock, curing the composition, and then punching the individual cushion pads from the unit structure and introducing them to and causing them to adhere in the shells.

A further feature of the invention concerns the making of closure caps by shaping a sheet of curable elastic composition to provide at a front face thereof a plurality of spaced thick annular rings having thin central webs, and having extremely thin connecting webs joining the rings, and then curing the composition to provide a unit structure which can be stored and handled in succeeding operations of punching the individual cushion pads from the unit structure and introducing them into the crown shells.

A further feature of the invention is the shaping of an advancing sheet of curable elastic composition to provide on a front face thereof a plurality of spaced annular thick rings each having a thin central web and with the rings being joined into a unit structure by thin connecting webs of scrap stock, the rear face being essentially smooth, curing the composition, and thereafter punching the individual cushion pads from the unit structure for introducing into shells, while withdrawing the connecting web as a perforated scrap sheet.

Another feature of the invention is the shaping of an advancing sheet of curable elastic composition to provide at a front face thereof a plurality of spaced annular thick rings each having a thin central web, with the rings being joined into a unit structure by thin connecting webs of scrap stock, the rear face being continuous and essentially smooth, curing the composition, and applying an adhesive to the smooth rear face thereof.

With these and other features as objects in view, an illustrative form of practicing the invention is shown on the accompanying drawings, in which:

Figures 1 and 1A are related views, constituting a conventionalized showing of apparatus parts arranged for the practice of the invention.

Figure 2 is a plan view of an advancing sheet of material, indicating the successive operations performed thereon.

Figure 3 is a view in an upright plane corresponding to that of Figure 1, showing parts of a shaping roller assembly.

Figure 4 is a longitudinal section through a part of the advancing sheet, on a larger scale than that of Figures 1–1A and 2, and indicating the shaping and punching of the sheet, and the delivery of a cushion pad therefrom.

Figure 5 is a diametrical section through a completed crown cap.

Figure 6 is a modified assembly of the initial part of the assembly in Figures 1–1A.

In Figures 1–1A, a mass of curable elastic composition 10 is placed in the nip of the two revolving calender rolls 11, 12, the spacing between these rolls being adjusted to provide finally a sheet of the elastic composition stock having a thickness of about 0.008 to 0.015 inch, so that a traveling sheet or web 13 is formed of corresponding thickness. This sheet is then delivered over the smooth-surfaced backing roll 14 which may be adjusted with respect to the roll 12 to complete the accurate dimensioning of the advancing sheet in thickness. This operation of shaping the sheet 13 is continued by the pressure roll 15, and then the sheet 13 is delivered over a backing roll 14a working in conjunction with a hollow curing roll 15a, from which the now-cured and shaped sheet 20 is taken by a delivery roll 16.

A smooth endless steel tension belt 17 passes in a tortuous path over the surface of backing roll 14a, then receiving the sheet 13 and conveying this sheet against the surface of the curing roll 15a, while exerting pressure upon it for a major part of the periphery of the curing roll 15a; and then the tension belt 17 passes around the delivery roll 16, with the partly or completely cured sheet 20 still engaged with the outer surface thereof; and finally the tension belt 17 returns in flight, by passing around the turning rolls 18. Steam-heated jacket sections 19 are provided, for causing a heating of the tension belt to control temperature conditions. Likewise, steam is introduced to the backing roll 14a and to the curing roll 15a, for example through the illustrated hollow shafts thereof.

Upon leaving the delivery roll 16, the shaped sheet or web 20, during use of a quickly curable composition which attains a full cure during operation of the roll 15a at its prevailing speed and temperature, may be cooled and then rolled or otherwise packaged for storage or shipment. If a slower cure is desired, for a particular composition or run of the equipment, the oven 22 is heated as by hot air so that the cure continues and is completed during the passage of the tension belt 17 through the oven, and thereafter the sheet or web 20 may be cooled, rolled and stored or shipped.

It is presently preferred, however, to continue to advance the sheet or web 20, for example over the conveying rollers 25 and the spray nozzles 26 which deliver an adhesive from a supply 28 and pump 29 to the web. Such adhesive may then be dried to non-tacky condition by a heated oven 27, preliminary to rolling or to immediate employment.

It is also preferred to continue the movement of the advancing sheet 21, bringing it beneath the intermittently-driven registry feed roller 40, which is engraved to accomplish the registry, and over the counter-roller 41, and thus beneath a punch 43 which is reciprocated in the guide 44 by a crank rod 45 driven by an eccentric pin 46 of a crank arm 47. Beneath the guide 44 is the perforated die 50 which supports the sheet 21 except for the area of a cushion pad, whereby as the punch 43 descends, it cuts (Figure 4) a cushion pad from the sheet 21 and forces it downward through the die 50. It will be understood that where more than one line of cushion pads is provided on the sheet, for example the five lines shown in Figure 2, a corresponding number of punches 43 will be provided and driven in unison.

As a result of the punching operations, all of the cushion pads are cut from the sheet 21, leaving as a residue a flimsy perforated scrap sheet 51, composed of the thin connecting webs, which may be formed into a roll 52 and discarded: the loss in scrap, with close fitting of the annular rings so that the webs are very narrow, may be of the order of 5 per cent.

Likewise, in this preferred form, a chain belt 60 is employed to receive, locate, and deliver, crown shells in timed relation to the movements of the punch 43, so that a crown shell is presented beneath the aperture of the die 50, at each descent of the punch 43. This motion can be accomplished intermittently in timed relation to the punch movement by providing a crank arm 61 on the shaft 62' which carries the crank arm 47, and utilizing the motion of this crank arm 61, which is 180 degrees out of phase with the movement of the punch 43, for actuating a link 62 which in turn drives a rocker 63 carrying a pawl 64 engaging with a ratchet 65 forming a part of the end sprocket 65' for controlling and driving the chain belt 60. This sprocket 65' can be connected in driving relation to the registry feed roller 40, so that the conveyer belt 60 and the sheet 21 move together but through distances varying with their effective diameters, whereby the sheet is advanced and a new crown shell is brought to position, during each upward movement of the punch 43: and are held in such positions during the downward movement of the punch, while the pawl 64 is idly returning.

With this arrangement it is also feasible to supply an adhesive directly into each crown shell, before this crown shell is advanced to the receiving position beneath the die 50. For this purpose, a shaft 70 which may be connected for a 1:1 speed relationship drive from the shaft 62', is provided with a crank pin 71 for driving a crank rod 72 and thereby actuating a fluid pump 73 which takes a liquid adhesive cement from a supply pipe 74 and delivers the same through a pipe 75 so that a calibrated quantity, dependent upon the pump volume per stroke, is delivered into each successive crown shell, in timed relationship as this shell momentarily dwells while an earlier-filled shell is beneath the die 50. It will be understood that this supply of adhesive into the crown shell may be used in addition to or in substitution for the coating of adhesive from the supply 28 onto the sheet 20.

It will be understood that where the sheet or web 20 or 21 has been rolled and stored, it can be fed to the rollers 40, 41, and operated upon in the same fashion. Likewise, when the applying assembly is located at a bottling works, the shipped roll of web 20 or 21 can be delivered to the rollers 40, 41 thereat.

In the modified form of Figure 6, the calender assembly of rollers 11, 12, 14 produce from the mass 10 a sheet 13b. The roller 15b is engraved, to provide the desired shaping of the cushion pads; and delivers the advancing sheet or web onto a traveling belt 17b, which passes over rolls 18b and conducts the web through the curing oven 22b, from which the web or sheet 20 emerges in cured form, for employment as described with Figure 1.

The forming of the sheet 13, for providing at a front face of the sheet closely juxtaposed thick annular rings each having a thin central web portion with the rings joined into the unit structure of the sheet by thin connecting webs of scrap stock, may be accomplished by pressing the moldable and curable composition between a smooth backing roll and an engraved shaping roll. As shown in Figure 3, this backing roll may be either the calender backing roll 14 or the heated backing roll 14a: and the engraved shaping roll may be either the calender roll 15 or the heated curing roll 15a. It will be noted that where the curing roll 15a is thus engraved, the actual surface brought into contact with the rear face of the sheet 13 is the surface of the steel tension belt 17, the same being supported by the smooth underlying surface of the backing roll 14a during the course of squeezing for causing the material to flow until (Figure 4) the sheet having an original uniform thickness of 0.008 to 0.015 inch is caused to thicken in parts to provide the annular ribs 80, having a thickness of, say, 0.020 to 0.035 inch, the inside of each ring being provided with a thin central web 81 having a thickness of, say, 0.005 to 0.010 inch. Adjacent rings are joined into the unit structure of the uncured sheet 13 or 13b and of the cured sheet 20, 21 by very thin connecting webs 82 which may have a thickness of less than 0.003 to 0.005 inch.

As shown in Figure 4, as this sheet 13 or 13b, 20, 21 advances, it comes beneath the guide 44 and over the die 50 so that the punch 43 can descend and punch from the sheet a cushion pad 85 and deliver this directly into a cap structure, e. g. the crown shell 87 shown as positioned in a pocket 88 of a link 89 constituting a part of the chain belt 60. Reaction supports, so that the punch 43 can press the cushion pad 85 into the crown shell 87, are illustrated as the rollers 91. A heated blast from the nozzle 92 maintains the temperature of the link 89, and thereby of the crown shell 87 so that the adhesion of the cushion pad 85 is thermally produced.

The completed crown cap may be as illustrated in Figure 5, in which the crown shell has a circular end face of closure portion 100 bounded by the top corner radius 100' leading to the corrugated skirt 102. The cushion pad has the annular thick ring portion 80 and the thin central web 81 exhibited at its upper or front face, and has a smooth back or rear face held by the thin adhesive layer 101 to the crown shell.

A suitable curable elastic composition may be prepared by:

| | Parts by weight |
|---|---|
| Crepe rubber (natural latex rubber) | 88 |
| Semi-solid isobutylene polymer | 12 |
| Hydrated precipitated calcium silicate | 63 |
| Clay | 65 |
| Zinc oxide | 5 |
| Stearic acid | 2 |
| Heptylated diphenylamine | 1 |
| Dipentamethylene thiuram tetrasulfide | 1 |
| Tetramethyl thiuram monosulfide | 1.5 |

The crepe rubber is worked on a rubber mill, with the rolls heated by steam to about 150° F. until plastic or "broken down." The plasticizer (isobutylene polymer above) is added and thoroughly incorporated by continued milling. The anti-oxidant (substituted diphenylamine above), pigments and fillers (zinc oxide, clay and silicate above), lubricant waxy material (stearic acid above), and vulcanizing agent (the tetrasulfide above as source of available sulfur, and the monosulfide as activator or secondary agent) are then added and incorporated during the milling, the rolls being gradually separated as these are added. After thorough incorporation, the batch is sheeted out at the desired thickness, cooled, and wrapped in cellophane, holland cloth, or like sheeting for storage and handling. This processing is a normal one in the rubber industry and no claim is made herein to the same as an independent invention. The materials and quantities for providing a thermo-adhesive and thermo-plastic curable composition, which is elastic when cured, can be varied in ways known to the expert in the art; it being preferred where a rubber-based seal is to close a vessel containing a foodstuff or other article where freedom from off-odor or off-taste is required, that no elemental sulfur be introduced but that the sulfur be present in a combined form which yields sulfur upon demand of the mixture during the curing operation. Other compositions can be employed, as will be understood by the expert in the vulcanizable rubber arts.

This material will work easily on a rubber mill and between the forming rolls 11, 12, to provide a sheet of uniform thickness and characteristics; and, when cured, can be passed immediately to the punching and inserting station and caused to adhere in the shell without employment of any separate adhesive if the shell is at a temperature of, say, 200 to 350° F. and is held in contact under pressures of 10 to 100 pounds per square inch for a quarter second to 2 seconds, the temperature and time being inversely related. Further, the cured sheet or web may be covered with adherent holland cloth or the like as the strip leaves the tension belt 17, rolled up, and later made ready for direct adhesion under like conditions, by peeling off just before use.

Vinyl resin elastomers can be employed, with preference for high chloride content vinyl and vinylidine polymer and copolymer resins when the container contents are aqueous so that water or moisture vapor penetration is to be restricted. Such compositions can comprise the vinyl resin, a plasticizer such as diamyl phthalate, dioctyl phthalate, and other phthalates as illustrations of known vinyl resin plasticizers, inert fillers and a lubricant such as petrolatum. Where the container is to hold materials such as non-aqueous oils, vinyl acetate resins may be employed.

Other formulations and materials may be employed, as will be understood by the expert in the rubber and elastic plastics art.

It is presently preferred to employ an adhesive for assuring the bond of the seal to its shell. Such adhesives may be employed as a dried hot-tacky film applied to the sheet and shipped therewith, or as a separate coating upon the sheet or web of seals immediately prior to employment, or as a deposit in the shell, or as combinations thereof dependent upon the selected elastic composition, the purpose of use, and the selected adhesive component.

The adhesive employed for the supply 28 is preferably of heat-sealing type, which is non-tacky at ordinary temperature, but becomes adhesive upon heating to a temperature of, say 250 to 300° F., when such temperature is produced in the shell 88 by the heating from the link 89 for example. Hot-sealing plasticized vinyl resin adhesives, liquefied isobutylene polymer, rubber cements, and other hot-sealing adhesives can be used at the supply 28. The same adhesive may be employed for delivery by the pump 73, care being taken to maintain the pump and conduits at such temperature to prevent plugging. It is also feasible to employ solvent type adhesives, as rubber cements, by the action of the pump 73.

It will be understood that the illustrative form of practice is not restrictive: and that changes may be made therein within the scope of the appended claims.

I claim:

1. The method of making closure seals, which comprises forming a curable elastic composition into a sheet, shaping the sheet to provide a plurality of spaced cushion pad configurations each having an annular thick ring with a thin central web, said pad configurations being joined into a unit structure by thin connecting webs of scrap stock, curing the composition as a shaped sheet, and punching the individual cured cushion pad configurations from the cured shaped sheet and introducing them into cap structures while withdrawing the connecting webs as a perforated scrap sheet.

2. The method of making closure seals, which comprises rolling a curable elastic composition into a sheet, advancing the sheet between an engraved forming roll and a smooth backing roll whereby to form a front face of the sheet with a plurality of spaced cushion pad configurations each having an annular thick ring with a thin central web, said pad configurations being joined into a unit structure by thin connecting webs of scrap stock, curing the composition as a shaped sheet, and applying an adhesive coating to the smooth side of the cured unit structure.

3. The method as in claim 2, in which the adhesive is of heat-sealing type, and including the additional step of reducing said adhesive to non-tacky condition.

4. The method of making closure seals, which comprises forming a sheet of cured elastic composition with a plurality of cushion pad configurations at one face thereof, said pad configurations being joined into a unit structure by thin connecting webs of scrap stock, positioning crown shells opposite seelcted cushion pad configurations of said cured unit structure, punching the selected cushion pad configurations from the cured unit structure and delivering them as individual cushion pads into the positioned crown shells, and effecting adhesion of the cushion pads in the crown shells.

5. The method of making closure seals, which comprises forming a sheet of curable elastic composition with a plurality of cushion pad configurations at one face thereof, each cushion pad configuration comprising a thick annular ring with a thin central web, said pad configurations being joined into a cured unit structure by thin connecting webs of scrap stock, curing the composition as a shaped sheet, positioning crown shells opposite selected cushion pad configurations of said cured unit structure, punching the selected cushion pad configurations from the cured unit structure and transferring them as individual cushion pads into the positioned crown shells, and effecting adhesion of the cushion pads in the crown shells.

6. The method of making closure seals, which comprises roll-shaping a continuous sheet of curable elastic composition with a plurality of cushion pad configurations therein, each cushion pad configuration at a front face of the sheet having a thick annular ring with a thin central web, said pad configurations being joined in the continuous sheet by thin connecting webs of scrap stock, the rear face of the sheet being essentially smooth, curing the composition as a shaped sheet by advancing the shaped sheet through a heated zone, applying an adhesive coating to the rear face of the advancing cured sheet, successively punching the cushion pad configurations from the advancing cured sheet and thereby forming individual cushion pads, positioning crown shells opposite the cured cushion pad configurations in timed relationship to receive the punched cushion pads, and effecting bonding of said coated cushion pad to the respective crown shells.

7. The method of making closure seals, which comprises roll-shaping a continuous sheet of curable elastic composition with a plurality of cushion pad configurations therein, each cushion pad configuration at a front face of the sheet having a thick annular ring with a thin central web, said pad configurations being joined in the continuous sheet by thin connecting webs of scrap stock, the rear face of the sheet being essentially smooth, curing the composition as a shaped sheet by advancing the shaped sheet through a heated zone, successively punching the cured cushion pad configurations from the advancing sheet and thereby forming individual cushion pads, positioning crown shells opposite the cured cushion pad configurations in timed relationship to receive the punched cured cushion pads, and heating the crown shells and thereby effecting bonding of said cured composition to the respective crown shells.

8. The method of making closure seals, which comprises roll-shaping a continuous sheet of curable elastic composition with a plurality of cushion pad configurations therein, each cushion pad configuration at a front face of the sheet having a thick annular ring with a thin central web, said pad configurations being joined in the continuous sheet by thin connecting webs of scrap stock, the rear face of the sheet being essentially smooth, curing the composition as a cured sheet by advancing the shaped sheet through a heated zone, applying an adhesive coating to the rear face of the advancing cured sheet, successively punching the cushion pad configurations from the advancing cured sheet and thereby forming individual cushion pads, positioning crown shells opposite the cured cushion pad configurations in timed relationship to receive the punched cured cushion pads, and heating the crown shells while pressing the cushion pads into contact therewith and thereby effecting bonding of said coated cushion pad to the respective crown shells.

9. The method of making closure seals, which comprises roll-shaping a continuous sheet of curable elastic composition with a plurality of cushion pad configurations therein, each cushion pad configuration at a front face of the sheet having a thick annular ring with a thin central web, said pad configurations being joined in the continuous sheet by thin connecting webs of scrap stock, the rear face of the sheet being essentially smooth, curing the composition as a shaped sheet by advancing the shaped sheet through a heated zone, successively punching the cured cushion pad configurations from the advancing sheet and thereby forming individual cushion pads, delivering an adhesive into crown shells and positioning the said crown shells opposite the cushion pad configurations in timed relationship to receive the punched cured cushion pads, and effecting bonding of the cushion pads in said crown shells by said adhesive.

10. The method of making closure seals, which comprises forming a curable elastic composition into a sheet, shaping the sheet to provide a plurality of spaced cushion pad configurations joined into a unit structure by thin connecting webs of scrap stock, heating the sheet and effecting at least a partial curing of the composition during the course of the shaping, and separating the individual cushion pad configurations from the shaped sheet.

11. The method of making closure seals, which comprises forming a curable elastic composition into a sheet, shaping the sheet at one face thereof to provide a plurality of spaced cushion pad configurations joined into a unit structure by thin connecting webs of scrap stock, curing the sheet while maintaining the material of the pad configurations in shaped form, and removing the sheet from the zone where the said curing operation is conducted when the pad configurations are in cured condition.

12. The method of making closure seals, which comprises forming a curable elastic composition into a sheet, advancing the sheet through a heated shaping zone in which the sheet is provided at one face with a plurality of spaced cushion pad configurations joined into a unit structure by thin connecting webs of scrap stock, and effecting at least a partial curing of the shaped sheet material while in the shaping zone.

13. The method of making closure seals, which comprises rolling a curable elastic composition into a sheet, advancing the sheet between an engraved forming roll and a smooth backing roll whereby to form a front face of the sheet with a plurality of spaced cushion liner pad configurations each having an annular thick ring with a thin central web, said liner pad configurations being joined into a unit structure by thin connecting webs of scrap stock, heating the sheet and effecting at least a partial curing of the composition during the course of the forming, and punching the individual cured cushion liner pad configurations from the unit structure.

14. The method of making closure seals, which comprises rolling a curable elastic composition into a sheet, advancing the sheet between an engraved forming roll and a traveling smooth pressure surface whereby to shape a front face of the sheet with a plurality of spaced cushion liner pad configurations, said liner pad configurations being joined into a unit structure by thin connecting webs of scrap stock, and heating the material of the sheet during the shaping and maintaining the sheet in contact with the forming roll and backing surface for a major part of the periphery of the roll whereby to effect at least a partial curing of the composition while held in shaped condition.

15. Apparatus for making closure seals, comprising means for forming a continuous sheet of curable plastic composition, means for advancing and shaping the sheet including an engraved forming roll and a smooth backing roll for forming a front face of the sheet with a plurality of spaced cushion pad configurations each having an annular thick ring with a thin central web, said pad configurations being joined into a unit structure by thin connecting webs of scrap stock, heating devices effective for curing the composition as a shaped sheet during its advancement, means for presenting and moving shells in juxtaposition to the sheet, and means for advancing the sheet and punching selected cushion pad configurations from the shaped and cured sheet and delivering the punched cushion pads into juxtaposed shells, and means for procuring adhesion of the pads in their respective shells.

References Cited in the file of this patent

UNITED STATES PATENTS

| Number | Name | Date |
|---|---|---|
| 806,625 | Beecher | Dec. 5, 1905 |
| 1,486,937 | Taliaferro | Mar. 18, 1924 |
| 1,624,849 | Steele et al. | Apr. 12, 1927 |
| 1,797,568 | Dean | Mar. 24, 1931 |
| 1,996,048 | Madina | Mar. 26, 1935 |
| 2,103,860 | Mazzeo | Dec. 28, 1937 |
| 2,322,885 | Rogers | June 29, 1943 |
| 2,516,647 | Rogers et al. | July 25, 1950 |
| 2,593,439 | Gora | Apr. 22, 1952 |
| 2,621,138 | Messing | Dec. 9, 1952 |